(12) United States Patent
Gandert

(10) Patent No.: US 7,717,076 B2
(45) Date of Patent: May 18, 2010

(54) METHOD FOR STARTING AN ENGINE OF A VEHICLE

(75) Inventor: Volker Gandert, Unterriexingen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/565,180

(22) PCT Filed: Jun. 4, 2004

(86) PCT No.: PCT/DE2004/001161
§ 371 (c)(1),
(2), (4) Date: Apr. 5, 2007

(87) PCT Pub. No.: WO2005/015006
PCT Pub. Date: Feb. 17, 2005

(65) Prior Publication Data
US 2007/0284944 A1    Dec. 13, 2007

(30) Foreign Application Priority Data
Jul. 28, 2003    (DE)    ................................. 103 34 242

(51) Int. Cl.
*F02N 17/00* (2006.01)
*G06F 19/00* (2006.01)
(52) U.S. Cl. ..................... 123/179.3; 701/113
(58) Field of Classification Search ............ 123/179.1, 123/179.3, 179.4; 701/113; 290/40 R, 40 A, 290/41; 180/65.2
See application file for complete search history.

(56) References Cited

U.S. PATENT DOCUMENTS 6,384,490 B1    5/2002    Birzl et al.
6,702,405 B1 *  3/2004    Balz et al. ................... 303/192

FOREIGN PATENT DOCUMENTS

| DE | 33 03 455     | * | 10/1983 |
| DE | 197 32 924 A1 | * | 2/1998  |
| DE | 197 32 964    |   | 2/1998  |
| EP | 1 066 181     |   | 8/2002  |
| GB | 2 317 660 A   | * | 4/1998  |
| JP | 05-310119     | * | 11/1993 |
| WO | WO 99/50112   | * | 10/1999 |

OTHER PUBLICATIONS

"How to Push-Start a Car With a Dead Battery." Online Posting. eHow, Inc. Mar. 8, 2008. <http://www.ehow.com/PrintArticle.html?id=7414>.*
"Manual transmission." Wikipedia, The Free Encyclopedia. Feb. 11, 2008, 22:58 UTC. Wikimedia Foundation, Inc. Mar. 8, 2008 <http://en.wikipedia.org/w/index.php?title=Manual_transmission &printable=yes>.*

* cited by examiner

*Primary Examiner*—Noah Kamen
(74) *Attorney, Agent, or Firm*—Kenyon & Kenyon LLP

(57) ABSTRACT

A method for starting an engine of a vehicle ensures that a stationary vehicle cannot unintentionally begin to move during the starting operation. In the event of a starting command, a check is made as to whether the vehicle is stationary. If the vehicle is stationary, at least one vehicle brake is activated. After activation of the vehicle brake, starting of the engine is authorized.

19 Claims, 2 Drawing Sheets

METHOD FOR STARTING AN ENGINE OF A VEHICLE

BACKGROUND INFORMATION

In the great majority of passenger automobiles, the engine is started by the fact that the driver moves the key of the ignition and starting switch into a starting position and holds it there until the engine has started up. When the driver releases the key, the starter is immediately deactivated. In this context, it is left up to the driver to hold the ignition key in the starting position until the engine starts up under its own power or the starting operation needs to be discontinued.

For convenience reasons, a so-called automatic start function has been integrated into some vehicles; with this, the driver either briefly presses a starter button or briefly moves the ignition switch to the starting position, and an automatic control system activates the starter until the engine starts up under its own power. It is problematic in this context that with an automatic starting operation of this kind, this starting operation cannot then be discontinued if, for example, persons appear in front of the vehicle and the transmission is not in neutral or the clutch has not disengaged.

SUMMARY OF THE INVENTION

The method according to the present invention for starting an engine of a vehicle has the advantage that in the event of a starting command, a check is made as to whether the vehicle is stationary; that if the vehicle is stationary, at least one vehicle brake is activated; and that after activation of the vehicle brake, starting of the engine is authorized. This prevents the vehicle from unintentionally beginning to move in the context of an automatic starting operation. This enhances driving safety, especially when persons appear in front of the vehicle during an automatic starting operation.

It is particularly advantageous if the at least one vehicle brake is released again after an engine startup. This allows the vehicle to be moved as desired by the driver after starting.

It is also advantageous if the engine is automatically started after starting of the engine is authorized. This makes an automatic engine start possible with no danger that the vehicle will unintentionally begin to roll.

It is furthermore advantageous if, in the event a starting authorization is not present within a predefined time period following the existence of the starting command or of a starting authorization request associated therewith, an automatic start of the engine is excluded. The result is also to prevent an automatic start of the engine when a starting authorization takes too long to occur, for example because of a defective activation of the at least one vehicle brake or a defective authorization signal after the predefined time period has elapsed. Driving safety can thereby be even further enhanced.

It is furthermore advantageous if starting is authorized only if a determination is made that a drive system of the vehicle is disengaged from the engine. This once again prevents the vehicle from unintentionally beginning to move upon starting; stress on the at least one vehicle brake is additionally reduced, since the vehicle is, for example, in any case in neutral.

The corresponding advantage is obtained if starting is authorized only if a determination is made that a clutch of the vehicle is actuated. In this case as well, the vehicle is prevented from unintentionally beginning to move upon starting, stress on the at least one vehicle brake additionally being reduced.

An advantage is also obtained if starting of the engine is authorized in the event the vehicle is not stationary. The result is that an automatic starting operation is not prevented in the event the vehicle is already rolling, since in this case it may be expected that the driver wishes to initiate the automatic start even though the vehicle is rolling, i.e. the rolling is not unintentional and the driver can assess and also therefore expect that this rolling motion will not jeopardize driving safety.

DETAILED DESCRIPTION

Figure 1:
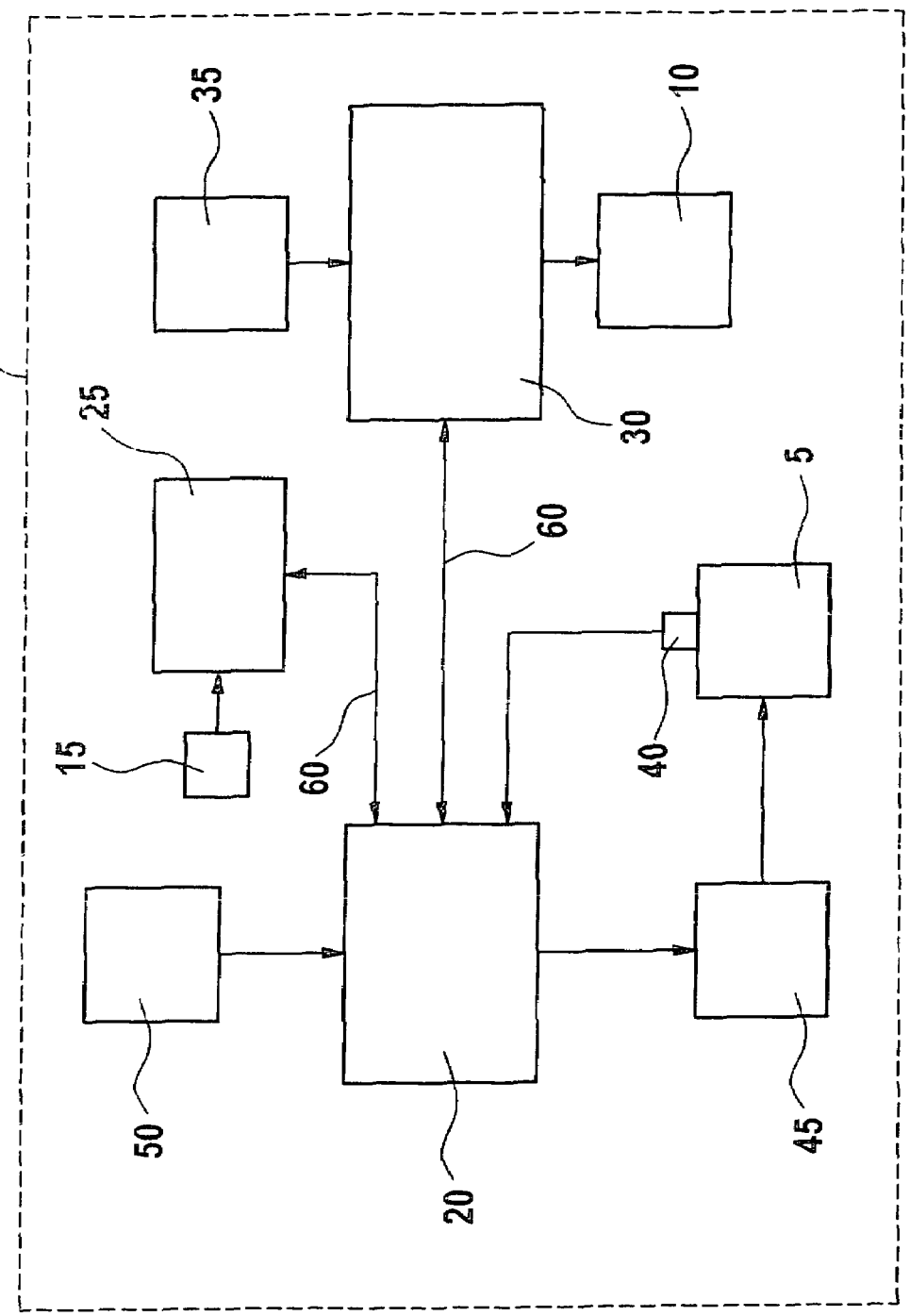
FIG. 1 is a block diagram of a vehicle.

In FIG. 1, a vehicle that is driven by an engine 5 is labeled 1. The engine can be, for example, a combustion engine or an electric motor, or an engine based on an alternative drive concept. In the case of a combustion engine, it can be e.g. a spark-ignited engine or a diesel engine. Vehicle 1 encompasses an engine control system 20 and a control unit 30 for activating at least one vehicle brake 10. Control unit 30 can be, for example, a control unit for an antilock braking system and/or a vehicle stability system. Also provided, if applicable, is a transmission control system 25. Engine control system 20, control unit 30, and transmission control system 25 can exchange information and/or instructions with one another via a communication system 60 that can be embodied, for example, as a CAN bus. Alternatively, engine control system 20, control unit 30, and transmission control system 25 can also be implemented in terms of their functionalities, on a software and/or hardware basis, in a combined control unit, and can exchange information and/or instructions with one another via corresponding communication lines. Vehicle 1 further encompasses a starting switch 50 that is connected to engine control system 20 and, upon actuation, delivers a starter request to engine control system 20. Starting switch 50 can be embodied, for example, as an ignition and starting switch or as a starter button. Engine control system 20 is further connected to a starter 45. As a function of a control signal of engine control system 20, starter 45 starts engine 5 of vehicle 1. Disposed on engine 5 is an engine rotation speed sensor 40 that senses the engine speed of engine 5 and transfers it to engine control system 20. Additionally provided is a detection unit 15 that in the case of an automatic transmission detects the gear ratio that is engaged, and in the case of a manual transmission detects an actuation of the clutch. The vehicle furthermore encompasses a wheel rotation speed sensor suite 35 that is connected to control unit 30 and informs control unit 30 whether vehicle 1 is stationary or moving. Control unit 30 activates at least one vehicle brake 10.

Provision is made, according to the present invention, that upon actuation of the starter button or upon rotation of the ignition key in the ignition and starting switch into the starting position, a starting authorization request is generated by engine control system 20 and transferred to control unit 30 via communication system 60. Control unit 30 then checks, by evaluating wheel rotation speed sensor suite 35, whether the vehicle is at a standstill. If so, control unit 30 causes the at least one vehicle brake 10 to immobilize vehicle 1, and communicates to engine control system 20 the authorization for starting. If, on the other hand, control unit 30 ascertains by evaluation of wheel rotation speed sensor suite 35 that the vehicle is rolling, it sends the starting authorization directly to engine control system 20 without brake activation. Before starting is initiated, provision can additionally be made for engine control system 20 to check, by querying transmission control system 25, whether the vehicle's drive system is disengaged from engine 5. Transmission control system 25 evaluates detection unit 15 for this purpose. This is accomplished, in the case of an automatic transmission, by the fact that detection unit 15 checks whether the "P" or "N" gear ratio is engaged, i.e. whether vehicle 1 is in "Park" or "Neutral" and the drive system of vehicle 1 is therefore disengaged from engine 5. If a gear ratio different from the aforesaid gear ratios is engaged, detection unit 15 then recognizes that the drive system of vehicle 1 is connected to engine 5. In the case of a manual transmission, detection unit 15 can be embodied as a clutch switch or clutch sensor, and detects whether the clutch is actuated. If so, engine 5 is therefore disengaged from the vehicle's drive system; otherwise engine 5 is connected to the vehicle's drive system.

If the starting authorization from control unit 30 is present, and (optionally) if engine 5 is additionally disengaged from the drive system of vehicle 1, engine control system 20 then causes starter 45 to perform an automatic starting operation, which is characterized in that after an initial actuation of the starter button or after an initial actuation of the ignition key, starting of engine 5 of vehicle 1 proceeds automatically with no further actuation by the driver. After the engine has started up, this being detected with the aid of engine speed sensor 40 after a predefined rotation speed threshold has been exceeded, starter 45 is deactivated and the starting authorization request from engine control system 20 to control unit 30 is canceled, so that control unit 30 can release the at least one vehicle brake 10 and transition into normal operation. If a starting authorization still has not been given by control unit 30 (for example because control unit 30 is defective, or communication between engine control system 20 and control unit 30 via communication system 60 is interrupted) within a predefined time period following the existence of the driver's starting command or actuation of starter switch 50, or following the generation, associated with the existence of the driver's starting command, of the starting authorization request by engine control system 20, engine control system 20 then switches over to a conventional start. Here starter 45 is activated only as long as the driver presses the starter button or holds the ignition key in the starting position. The driver can thus immediately discontinue the starting operation if the vehicle unintentionally begins to move.

Figure 2:
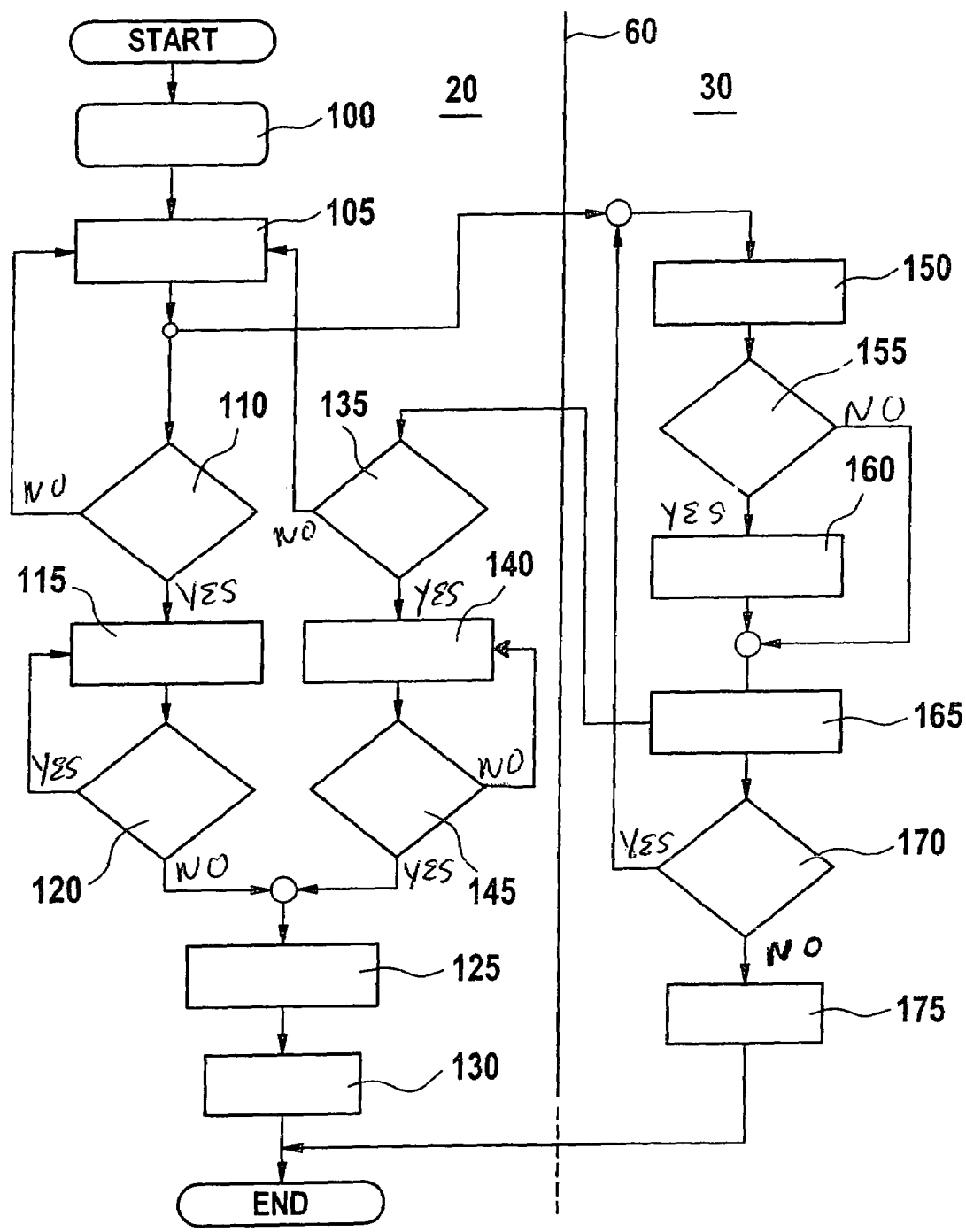
FIG. 2 shows a flow chart for an exemplifying sequence of the method according to the present invention.

The method according to the present invention is explained below by way of example with reference to the flow chart of FIG. 2. Once the program has been started, starting switch 50 is actuated by the driver at a program point 100. Execution then branches to a program point 105.

At program 105, engine control system 20 detects the actuation of starting switch 50 and thus the existence of a starting command, and generates the starting authorization request and conveys it to control unit 30 via communication system 60. Communication system 60 is depicted as an interface between engine control system 20 and control unit 30, the portion of the flow chart depicted to the left of interface 60 being executed in engine control system 20, and the portion of the flow chart depicted to the right of interface 60 being executed in control unit 30. Execution thus branches from program point 105 in engine control system 20 to a program point 150 in control unit 30.

At program point 150, control unit 30 queries wheel rotation speed sensor suite 35 regarding a wheel rotation speed of the wheels of vehicle 1. Execution then branches to a program point 155.

At program point 155, control unit 30 checks, on the basis of the wheel rotation speed signals received from wheel rotation speed sensor suite 35, whether vehicle 1 is at a standstill, If so, execution then branches to a program point 160, otherwise to a program point 165.

At program point 160, control unit 30 causes the at least one vehicle brake 10 to immobilize vehicle 1 or one or more wheels of vehicle 1, i.e. the at least one vehicle brake 10 is activated. Execution then branches to program point 165.

At program point 165, control unit 30 causes the creation of a starting authorization signal, and sends the latter to engine control system 20; execution branches in this context to a program point 135 in engine control system 20. Execution also branches from program point 165 to a program point 170 in control unit 30. At program point 170, control unit 30 checks whether the starting authorization request from engine control system 20 still exists. If so, execution branches back to program point 150; otherwise it branches to a program point 175.

At program point 175, control unit 30 causes release of the at least one vehicle brake 10, and thus transition into normal operation. Control unit 30 then exits the program.

At program point 135, engine control system 20 checks whether a starting authorization signal has been received from control unit 30 via communication system 60. If so, execution then branches to a program point 140; otherwise it branches back to program point 105, and a new starting authorization request is generated by engine control system 20 and sent to control unit 30.

At program point 140, engine control system 20 causes starter 45 to perform an automatic engine start, which proceeds without further actuation of starting switch 50 by the driver. Execution then branches to a program point 145.

At program point 145, engine control system 20 checks, on the basis of the engine speed signal supplied by engine speed sensor 40, whether the engine speed exceeds the predefined rotation speed threshold, i.e. whether engine startup is complete and engine 5 is running under its own power. The predefined rotation speed threshold is selected so that attainment thereof represents stable engine operation and thus completion of engine startup. If the sensed engine speed exceeds the predefined rotation speed threshold, execution branches to a program point 125; otherwise it branches back to program point 140 and the automatic starting operation continues.

At program point 125, engine control system 20 causes a shutoff of starter 45 and thus of the starting authorization request, and transmission of a corresponding deletion datum to control unit 30, which then (at program point 170) makes a No decision and branches to program point 175. After program point 125, execution branches to a program point 130.

At program point 130, vehicle 1 is operated by engine control program 20 in normal mode, i.e. the starting phase has been completed or discontinued. Engine control system 20 then exits the program.

From program point 105, execution additionally branches to a program point 110 on the engine control system 20 side.

At program point 110, engine control system 20 checks whether a predefined time period following the existence of a starting command or the generation of the starting authorization request has elapsed without reception of a starting authorization signal from control unit 30, for example because control unit 30 is defective or because communication between engine control system 20 and control unit 30 via communication system 60 is interrupted. If so, execution branches to a program point 115; otherwise it branches back to program point 105 and the starting authorization request is sent again to control unit 30. The predefined time period can be selected so that the requisite time for sending the starting authorization request to control unit 30, generating the starting authorization signal there, and sending the starting authorization signal to engine control system 20 is contained in the predefined time period at least once, and at most e.g. two or three times. The requisite time can, of course, also be contained at a greater multiple in the predefined time period. The greater the multiple at which the requisite time is contained in the predefined time period, however, the longer the starting operation can last. The predefined time should therefore be selected so that it is still as acceptable as possible to the driver.

At program point 115, engine control system 20 causes starter 45 to start engine 5. Execution then branches to a program point 120.

At program point 120, engine control system 20 checks whether starting switch 50 is still actuated. If so, execution branches back to program point 115, and engine control system 20 once again causes starter 45 to start engine 5. Otherwise execution branches to program point 125, and engine control system 20 causes starter 45 to discontinue the starting operation. The result is to implement the conventional starting operation, in which the driver must actuate starting switch 50 during the entire starting operation in order successfully to start engine 5.

Prior to activation of the automatic starting operation at program point 140, engine control system 20 can query transmission control system 25, via interface 60 or communication system 60, as to whether detection unit 15 has ascertained a disengagement between the drive system of vehicle 1 and engine 5, for example based on actuation of a clutch of the vehicle. Provision can be made in this context to authorize the automatic starting operation on the part of engine control system 20 only in this case of disengagement between engine 5 and the drive system of vehicle 1, and otherwise to prevent the automatic starting operation. This additional querying of the disengagement between engine 5 and the drive system of vehicle 1 is not absolutely necessary for safety reasons, since the starting authorization signal is generated by control unit 30 only if the at least one vehicle brake 10 has been activated. The disengagement between engine 5 and the drive system of vehicle 1 does, however, reduce stress on the at least one vehicle brake 10.

One or more further prerequisites for the starting operation that are known to one skilled in the art can, of course, also be examined prior to initiation of the automatic starting operation, and the automatic starting operation can be initiated only upon fulfillment of all the starting prerequisites that are to be checked. Engine control system 20 can furthermore, in addition to the activation of starter 45, also initiate further actions for engine starting that are known to one skilled in the art, for example buildup of fuel pressure if engine 5 is embodied as a combustion engine, or identification of the current crank angle position.

According to the present invention, therefore, control unit 30 checks on the basis of the wheel rotation speed information whether vehicle 1 is at a standstill. Control unit 30 activates the at least one vehicle brake 10 if it is established that vehicle 1 is not moving prior to engine start, thus preventing vehicle 1 from unintentionally starting to roll during the starting operation. If necessary, engine 5 is immobilized in this context if the transmission is not in neutral. If immobilization of engine 5 is to be prevented in order to avoid wear, engine control system 20 can then, as described, check not only for the existence of the starting authorization signal from control unit 30 but also whether engine 5 is disengaged from the drive system of vehicle 1, i.e., for example, whether a neutral gear is present. The automatic starting operation is initiated only if both the authorization signal from control unit 30 and disengagement between engine 5 and the drive system of vehicle 1 have been detected. If vehicle 1 is already rolling at the time of the driver's starting command, however, i.e. the actuation of starting switch 50 and thus the starting authorization request of engine control system 20, the automatic starting operation is authorized with no brake intervention by control unit 30. A vehicle that is already rolling can therefore be started without first bringing it to a stop.

The automatic starting function described above can be used both in vehicles with automatic transmission and in vehicles with manual transmission. Accidents caused by vehicles that begin to move unintentionally are thus reliably prevented even in the event of a defective mechanical transfer between the clutch pedal and the clutch.

An automatic starting operation decoupled from the driver can be optimally controlled by engine control system 20, and is thus not only more convenient but also permits functions that enable compliance with the strictest exhaust gas emissions standards.

What is claimed is:

1. A method for starting an engine of a vehicle, comprising:
   checking by a control unit, in the event of a starting command, whether the vehicle is stationary;
   if the vehicle is stationary, activating at least one vehicle brake;
   after the activation of the vehicle brake, authorizing a starting of the engine;
   if the vehicle is not stationary, authorizing a starting of the engine without a brake intervention; and
   automatically starting the engine after the starting of the engine is authorized.

2. The method according to claim 1, further comprising:
   if the vehicle is stationary, releasing the at least one vehicle brake after an engine startup.

3. The method according to claim 1, further comprising:
   in the event a starting authorization is not present within a predefined time period following an existence of one of the starting command and a starting authorization request associated therewith, excluding an automatic start of the engine.

4. The method according to claim 1, wherein the starting is authorized only if a determination is made that a drive system of the vehicle is disengaged from the engine.

5. The method according to claim 1, wherein the starting is authorized only if a determination is made that a clutch of the vehicle is actuated.

6. The method according to claim 1, further comprising:
   if the vehicle is stationary, releasing the at least one vehicle brake after an engine startup; and
   automatically starting the engine after the starting of the engine is authorized.

7. The method according to claim 6, wherein the starting is authorized only if a determination is made that a drive system of the vehicle is disengaged from the engine.

8. The method according to claim 6, wherein the starting is authorized only if a determination is made that a clutch of the vehicle is actuated.

9. The method according to claim 1, further comprising:
   if the vehicle is stationary, releasing the at least one vehicle brake after an engine startup; and
   in the event a starting authorization is not present within a predefined time period following an existence of one of the starting command and a starting authorization request associated therewith, excluding an automatic start of the engine.

10. The method according to claim 9, wherein the starting is authorized only if a determination is made that a drive system of the vehicle is disengaged from the engine.

11. The method according to claim 9, wherein the starting is authorized only if a determination is made that a clutch of the vehicle is actuated.

12. An apparatus for starting an engine of a vehicle, comprising:
a control unit configured to check, in the event of a starting command, whether the vehicle is stationary; and
at least one vehicle brake,
wherein if the vehicle is stationary, the control unit is configured to activate the at least one vehicle brake and to authorize starting of the engine after activation of the at least one vehicle brake, and wherein if the vehicle is not stationary, the control unit is configured to authorize starting of the engine without a brake intervention.

13. The apparatus according to claim 12, wherein if the vehicle is stationary, the control unit is configured to release the at least one vehicle brake after an engine startup.

14. The apparatus according to claim 12, wherein in the event a starting authorization is not present within a predefined time period following an existence of one of the starting command and a starting authorization request associated therewith, the control unit is configured to exclude an automatic start of the engine.

15. The apparatus according to claim 12, wherein the control unit is configured to authorize starting only if a determination is made that a drive system of the vehicle is disengaged from the engine.

16. The apparatus according to claim 12, wherein the control unit is configured to authorize starting only if a determination is made that a clutch of the vehicle is actuated.

17. The apparatus according to claim 12, wherein if the vehicle is stationary, the control unit is configured to release the at least one vehicle brake after an engine startup, and wherein in the event a starting authorization is not present within a predefined time period following an existence of one of the starting command and a starting authorization request associated therewith, the control unit is configured to exclude an automatic start of the engine.

18. The apparatus according to claim 17, wherein the control unit is configured to authorize starting only if a determination is made that a drive system of the vehicle is disengaged from the engine.

19. The apparatus according to claim 17, wherein the control unit is configured to authorize starting only if a determination is made that a clutch of the vehicle is actuated.

* * * * *